United States Patent Office 3,419,520
Patented Dec. 31, 1968

3,419,520
PRODUCT AND METHOD FOR VULCANIZATION OF RUBBER
Arthur W. Campbell, Terre Haute, Ind., and Bobby D. La Grone, Monroe, La., assignors to Commercial Solvents Corporation, a corporation of Maryland
No Drawing. Filed Jan. 22, 1965, Ser. No. 427,482
24 Claims. (Cl. 260—41.5)

ABSTRACT OF THE DISCLOSURE

A method for vulcanizing rubber and the rubber vulcanizate composition produced thereby, wherein the vulcanization is carried out in the presence of physical property-enhancing amounts of a compound of the formula:

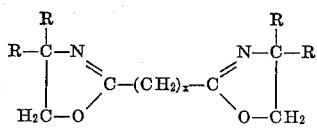

where R is hydrogen, lower alkyl or lower hydroxyalkyl and $x$ is an integer from 2 to 8.

---

This invention relates to a product and to a method for providing rubber-like materials having improved physical properties and is particularly concerned with a method for vulcanizing rubber-like materials using bisoxazoline compounds.

According to the present invention, it has been discovered that a series of bisoxazoline compounds provide vulcanizates having desirable physical properties, reduce the curing time, and effect a high degree of economy, both from their low cost of production and the unusually small quantities of the compound required for optimum effect. In producing the above desirable properties in rubber stocks, the bisoxazolines may function as an accelerator, an accelerator activator and/or as an enhancer of the reinforcing properties of additives such as clay, gums, carbon blacks, e.g. channel blacks, furnace blacks, medium thermal blacks, fine thermal blacks, etc.

While the exact nature of the functioning of the bisoxazolines is not known, the effect of the bisoxazoline compound on a carbon black loaded stock, for example, appears to be the result of two phenomena. The first and lesser phenomenon is due to a changed rate of cure and the second is a hitherto unexperienced or unobserved phenomenon which is called enhancement. To clearly separate these two phenomena recourse is taken to the cured stock and the values of modulus or load at a given elongation. Enhancement is a comparison of the effect of the bisoxazoline on the modulus in a basic stock with the effect of the bisoxazoline on the modulus in, for example, a carbon black loaded stock. The twenty minute cure, 300% modulus, is preferably used since it approaches the useful optimum cure. This is a reading taken under dynamic conditions, i.e. during the movement of the specimen under test. Tensile and elongation should be considered as static since they are the reading at the moment of cessation of motion. In addition, they are often referred to as the "accidental" results, since the break determines them and is itself the result of an accidental defect in the specimen. Modulus is the least affected by the defects.

In general, the bisoxazoline compounds useful in accordance with the present invention comprise bisoxazolines of the formula:

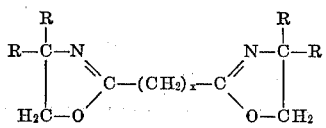

wherein R is selected from the group consisting of hydrogen, lower alkyl and lower hydroxyalkyl, and $x$ is an integer from 2 to 8. Such bisoxazolines include 2,2'-dimethylenebis-(4,4-dimethyl-2-oxazoline), 2,2'-trimethylenebis - (4,4 - dimethyl - 2 - oxazoline), 2,2' - tetramethylenebis - (4,4 - dimethyl - 2 - oxazoline), 2,2' - pentamethylenebis - (4,4 - dimethyl - 2 - oxazoline), 2,2'-hexamethylenebis - (4,4 - dimethyl - 2 - oxazoline), 2,2'-heptamethylenebis - (4,4 - dimethyl - 2 - oxazoline), 2,2' - octamethylenebis - (4,4 - dimethyl-2-oxazoline), 2,2' - dimethylenebis - (4,4 - bishydroxymethyl - 2 - oxazoline), 2,2'-pentamethylenebis - (4,4-bishydroxymethyl-2-oxazoline), 2,2'-dimethylenebis - (4,4' - diethyl-2-oxazoline), 2,2'-tetramethylenebis-(4-methyl-4-ethyl-2-oxazoline), etc.

The bisoxazoline compounds can be employed with both natural and synthetic rubbers. Thus, it is to be understood that the terms "rubber" or "rubber-like" are employed herein and in the appended claims in a generic sense to designate rubbery materials which are vulcanizable, e.g. with sulfur, including caoutchouc, balata, gutta percha, latex, rubber isomers, or synthetic rubber, including rubbery polymers of open-chain conjugated diolefins containing from 4 to 10 carbon atoms, such as 1,3-butadiene, neoprene, isoprene, chloroprene, 2,3-dimethyl butadiene-1,3, rubbery copolymers of such dienes with materials copolymerizable therewith such as acrylonitrile, styrene, methyl acrylate, methyl methacrylate, methacrylonitrile, methyl vinyl ether, vinyl substituted pyridine, isobutylene and other copolymerizable monomeric materials and other polymers such as ethylene-propylene terpolymers, etc. whether or not admixed with pigments, fillers, softeners, peptizers, antioxidants, etc.

The bisoxazoline is employed in amounts sufficient to enhance the physical properties of the resulting vulcanizate and these amounts may be as little as 0.01 weight percent of bisoxazoline based on the rubber, although the actual amount to be employed depends on the particular compound and the particular rubber. In general, the amount of bisoxazoline used will be from about 0.01 to about 15 or more parts by weight per 100 parts of rubber, with the amount usually ranging from about 0.01 to 10 parts.

The bisoxazoline used in the instant invention may be formed by the reaction of one mole of a dibasic acid with two moles of an aminohydroxy compound such as 2-amino-2-methyl-1-propanol (AMP). For example, 2,2'-tetramethylenebis-(4,4-dimethyl-2-oxazoline) is prepared from aminomethylpropanol (AMP) and adipic acid according to the equation:

$$2CH_3-\underset{\underset{CH_3}{|}}{\overset{\overset{NH_2}{|}}{C}}-CH_2OH + HO-\overset{O}{\overset{\|}{C}}-(CH_2)_4-\overset{O}{\overset{\|}{C}}-OH \longrightarrow$$

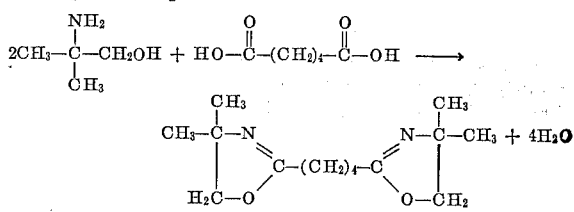

Bisoxazoline compounds useful in accordance with the present invention may be produced from practically all commercially available dibasic acids (except oxalic and malonic acid) which include the dibasic acids from succinic acid to sebasic acid, i.e., dibasic acids having a carbon chain length between the two acid groups of from 2 to 8 carbon atoms. As a group, the bisoxazolines used in accordance with the invention are water and alcohol soluble. The hepta- and octa-methylene compounds have low water solubility but are readily soluble in alcohol.

The practice of the present invention can involve the use of conventional vulcanizing agents, softeners, reinforcing agents, antioxidants, and fillers. The vulcanizing agent is usually sulfur, which is generally intimately admixed with the raw rubber in amounts between about 0.5 and 15 parts, based on 100 parts of rubber. Other vulcanization agents include selenium and sulfur dichloride. Reinforcing agents, or fillers, generally used in amounts from about 0 to 1 to 400 parts or more by weight per 100 parts by weight of rubber, include zinc oxide, clays, or magnesium carbonate but carbon black is preferred. However, it was particularly surprising to find that a significant degree of reinforcement was imparted to clay-filled stocks vulcanized with bisoxazolines. Asphaltic materials and stearic acid can be used as softeners, for instance in amounts from about 0 to 100 parts by weight per 100 parts by weight of rubber, and clay can be used, for instance in amounts from about 0 to 400 parts by weight per 100 parts by weight of rubber, to increase stiffness. Such components, and their proportions, are very familiar to those skilled in the art, and although the actual species and amounts of such materials which may be used in any particular instance will depend to a large extent upon the ultimate use for the vulcanized product, their determination, per se, is well within the ordinary skill of the available technical worker. The vulcanization is conducted under vulcanization conditions including temperatures generally from about 200° to 400° F. and conventional pressures.

The preparation and utilization of the bisoxazolines of the present invention are illustrated by the following examples. The reactants and their proportions and the other specific ingredients of the recipe are presented as being typical and should not be construed to limit the invention.

EXAMPLE I

Preparation of 2,2'-tetramethylenebis (4,4-dimethyl-2-oxazoline)

584 g. (4 mols) adipic acid and 890 g. (10 mols) 2-amino-2-methyl-1-propanol (AMP) were heated to reflux (100–110° C.) in a 2 m. packed (glass helices) column and 295 ml. of water were taken off. The reflux time was about 8 hours. The AMP was distilled through the column at 23–24 mm. Hg pressure and about 135 g. was recovered.

The residue was transferred to a 6-inch jacketed vigreux and distilled at 10 mm. pressure with the following products:

Up to 140° C. at 10 mm. _____ 0
140–162° C. at 10 mm. (product) _____ g__ 902
Residue _____ g__ 133

The product, 2,2'-tetramethylenebis (4,4-dimethyl-2-oxazoline), was clear, water white liquid. The yield, based on the acid, was 83.6%.

EXAMPLE II

Following the procedure of Example I, oxazoline compounds A–G were prepared with various dibasic acids. The results are summarized in Table I.

EXAMPLE III

The rubber enhancement properties of (1) 2,2'-tetramethylenebis - (4,4-dimethyl-2-oxazoline) and (2) 2,2'-octamethylenebis - (4,4-dimethyl-2-oxazoline) in a Thermax loaded stock are set forth below. Thermax is a medium thermal black. The formulations (1) and (2) in parts by weight and stress-strain properties for the cured rubbers and a control formulation (3) were as follows:

| Formulation | (1) | (2) | (3) |
|---|---|---|---|
| Nat. Rubber | 100 | 100 | 100 |
| Stearic Acid | 3 | 3 | 3 |
| Zinc Oxide | 5 | 5 | 5 |
| Benzothiazyldisulfide | 0.6 | 0.6 | 0.6 |
| Sulfur | 2.5 | 2.5 | 2.5 |
| Thermax | 75 | 75 | 75 |
| 2,2' tetramethylenebis-(4,4-dimethyl-2-oxazoline) | 2.0 | | |
| 2,2' octamethylenebis-(4,4-dimethyl-2-oxazoline) | | 2.0 | |
| 200% Modulus, p.s.i.: Minutes at 293° F.: | | | |
| 5 | 680 | 620 | 170 |
| 10 | 790 | 830 | 380 |
| 15 | 980 | 830 | 500 |
| 20 | 950 | 1,000 | 440 |
| 30 | 990 | 1,030 | 550 |
| 40 | 920 | 970 | 550 |
| 300% Modulus, p.s.i.: Minutes at 293° F.: | | | |
| 5 | 1,280 | 1,210 | 380 |
| 10 | 1,670 | 1,620 | 690 |
| 15 | 1,730 | 1,720 | 990 |
| 20 | 1,780 | 1,810 | 990 |
| 30 | 1,810 | 1,920 | 1,190 |
| 40 | 1,810 | 1,860 | 1,190 |
| 400% Modulus, p.s.i.: Minutes at 293° F.: | | | |
| 5 | 1,950 | 1,890 | 710 |
| 10 | 2,210 | 2,210 | 1,220 |
| 15 | 2,300 | 2,210 | 1,590 |
| 20 | 2,220 | 2,300 | 1,690 |
| 30 | 2,270 | 2,384 | 1,910 |
| 40 | 2,260 | 2,330 | 2,000 |
| 00% Modulus, p.s.i.: Minutes at 293° F.: | | | |
| 5 | 2,410 | 2,410 | 1,080 |
| 10 | 2,680 | 2,750 | 1,830 |
| 15 | 2,750 | 2,750 | 2,080 |
| 20 | 2,250 | | 2,210 |
| 30 | 2,670 | | 2,400 |
| 40 | | | 2,400 |
| Tensile, p.s.i.: Minutes at 293° F.: | | | |
| 5 | 3,090 | 3,190 | 1,730 |
| 10 | 2,680 | 3,180 | 2,520 |
| 15 | 2,890 | 2,750 | 2,720 |
| 20 | 2,750 | 2,750 | 2,790 |
| 30 | 2,670 | 2,770 | 2,650 |
| 40 | 2,590 | 2,610 | 2,790 |
| Elongation, percent: Minutes at 293° F.: | | | |
| 5 | 600 | 610 | 650 |
| 10 | 500 | 570 | 620 |
| 15 | 510 | 500 | 600 |
| 20 | 500 | 480 | 580 |
| 30 | 500 | 480 | 570 |
| 40 | 460 | 460 | 550 |
| Shore Hardness: Minutes at 293° F.: | | | |
| 5 | 55 | 55 | 40 |
| 10 | 60 | 60 | 48 |
| 15 | 62 | 61 | 49 |
| 20 | 62 | 62 | 51 |
| 30 | 63 | 62 | 54 |
| 40 | 63 | 63 | 55 |
| Scorch, Min. at 250° F | 7.0 | 8.5 | 15.0 |
| Cure Rate | 15.0 | 15.0 | 6.0 |
| Plasticity | 26.0 | 25.0 | 28.0 |

TABLE I.—BIS-OXAZOLINES PREPARED FROM AMP

| Compound | Acid | Mols Acid | Mols AMP | Product | Yield Percent | Neut. Eq. Calc'd. | Neut. Eq. Found | Boiling °C. Point, | Pressure (mm. Hg) |
|---|---|---|---|---|---|---|---|---|---|
| A | Succinic | 2 | 5 | 2,2'-Dimethylenebis-(4,4-dimethyl-2-oxazoline) (Crystalline). | 89.2 | 112 | 112.9 | 125 | 10 |
| B | Glutaric | 2 | 5 | 2,2'-Trimethylenebis-(4,4-dimethyl-2-oxazoline) (Liquid). | 82.0 | 119 | 120.7 | 93 | (1) |
| C | Adipic | 3 | 8 | 2,2'-Tetramethylenebis-(4,4-dimethyl-2-oxazoline) (Liquid). | 90.3 | 126 | 126.6 | 148 | 10 |
| D | Pimelic | 0.625 | 1.875 | 2,2'-Pentamethylenebis-(4,4-dimethyl-2-oxazoline) (Liquid). | 95.2 | 133 | 132.0 | 128 | (2) |
| E | Suberic | 1.15 | 4 | 2,2'-Hexamethylenebis-(4,4-dimethyl-2-oxazoline) (Liquid). | 89.4 | 140 | 140.2 | 134 | (3) |
| F | Azelaic | 2 | 5 | 2,2'-Heptamethylenebis-(4,4-dimethyl-2-oxazoline) (Liquid). | 84.8 | 147 | 148.7 | 180 | 10 |
| G | Sebacic | 1 | 3 | 2,2'-Octamethylenebis-(4,4-dimethyl-2-oxazoline) (Liquid). | 93 | 154 | 153.1 | 195 | 10 |

[1] 80μ.  [2] 600μ.  [3] 180μ.

EXAMPLE IV

The character of the enhancement produced by the addition of a bisoxazoline to the rubber stock and the effect of varying amounts of bisoxazoline are demonstrated by the following formulations (4)–(9).

| Formulation | (4) | (5) | (6) | (7) | (8) | (9) |
|---|---|---|---|---|---|---|
| Parts by weight: | | | | | | |
| Nat. Rubber | 100 | 100 | 100 | 100 | 100 | 100 |
| Stearic Acid | 3 | 3 | 3 | 3 | 3 | 3 |
| Zinc Oxide | 5 | 5 | 5 | 5 | 5 | 5 |
| Benzothiazyldisulfide | 0.6 | 0.6 | 0.6 | 0.6 | 0.6 | 0.6 |
| Sulfur | 2.5 | 2.5 | 2.5 | 2.5 | 2.5 | 2.5 |
| 2,2' tetramethylenebis (4,4-dimethyl-2-oxazoline) | | 2.0 | | 0.5 | 2.0 | 10 |
| Thermax | | | 75 | 75 | 75 | 75 |
| 300%, p.s.i.: | | | | | | |
| Minutes at 293° F.: | | | | | | |
| 15 | 160 | 400 | 990 | 1,520 | 1,730 | 1,080 |
| 20 | 210 | 420 | 990 | 1,550 | 1,780 | 1,080 |
| 30 | 210 | 420 | 1,190 | 1,560 | 1,810 | 1,190 |
| 40 | 240 | 480 | 1,190 | 1,560 | 1,810 | 1,150 |
| Tensile, p.s.i.: | | | | | | |
| Minutes at 293° F.: | | | | | | |
| 15 | 2,320 | 4,720 | 2,720 | 2,990 | 2,890 | 3,060 |
| 20 | 2,460 | 4,190 | 2,790 | 2,880 | 2,750 | 3,080 |
| 30 | 2,610 | 4,120 | 2,650 | 2,790 | 2,670 | 3,010 |
| 40 | 2,550 | 4,000 | 2,790 | 2,630 | 2,590 | 2,890 |
| Elongation, percent: | | | | | | |
| Minutes at 293° F.: | | | | | | |
| 15 | 900 | 700 | 600 | 570 | 510 | 580 |
| 20 | 850 | 700 | 580 | 540 | 500 | 580 |
| 30 | 790 | 680 | 570 | 520 | 500 | 570 |
| 40 | 790 | 680 | 550 | 510 | 460 | 570 |
| Hardness, 20 minutes at 293° F | 33 | 43 | 51 | 59 | 62 | 55 |
| Scorch, Min | 30 | 13 | 15 | 11 | 7.0 | 5.0 |

The enhancement produced by the bisoxazoline is shown by comparing the 300% modulus, 20 minute cure, as follows:

|  | P.s.i. |
|---|---|
| (A) Formulation (5) | 420 |
| Formulation (4) | 210 |
| Effect of bisoxazoline on cure | 210 |
| (B) Formulation (6) | 990 |
| Formulation (4) | 210 |
| Thermax effect | 780 |
| (C) Formulation (8) | 1780 |
| Formulation (6) | 990 |
| Effect of bisoxazoline on Thermax loaded stock | 790 |
| Effect of bisoxazoline on basic stock | 210 |
| Enhancement | 580 |

EXAMPLE V

The following formulations (10) and (11) demonstrate the effectiveness of bisoxazolines in natural rubber compounds.

| Formulation | (10) | (11) |
|---|---|---|
| Parts by weight: | | |
| Nat. Rubber | 100.0 | 100.0 |
| Stearic Acid | 3.0 | 3.0 |
| Zinc Oxide | 5.0 | 5.0 |
| Benzothiazyldisulfide | 0.6 | 0.6 |
| Sulfur | 2.5 | 2.5 |
| 2,2' tetramethylenebis (4,4-dimethyl-2-oxazoline) | | 2.0 |
| 300% Modulus, p.s.i.: | | |
| Minutes at 293° F.: | | |
| 5 | (¹) | 260 |
| 10 | (¹) | 390 |
| 15 | 160 | 400 |
| 20 | 210 | 420 |
| 30 | 210 | 420 |
| 40 | 240 | 480 |
| 500% Modulus, p.s.i.: | | |
| Minutes at 293° F.: | | |
| 5 | (¹) | 880 |
| 10 | (¹) | 930 |
| 15 | 350 | 1,350 |
| 20 | 390 | 1,450 |
| 30 | 410 | 1,390 |
| 40 | 460 | 1,280 |
| Tensile, p.s.i.: | | |
| Minutes at 293° F.: | | |
| 5 | (¹) | 4,080 |
| 10 | (¹) | ²3,690 |
| 15 | 2,320 | 4,720 |
| 20 | 2,460 | 4,190 |
| 30 | 2,610 | 4,120 |
| 40 | 2,550 | 4,000 |
| Elongation, Percent: | | |
| Minutes at 293° F. | | |
| 5 | (¹) | 800 |
| 10 | (¹) | ²700 |
| 15 | 900 | 700 |
| 20 | 850 | 700 |
| 30 | 790 | 680 |
| 40 | 790 | 680 |
| Shore Hardness: | | |
| Minutes at 293° F.: | | |
| 5 | (¹) | 36 |
| 10 | 24 | 42 |
| 15 | 29 | 43 |
| 20 | 33 | 43 |
| 30 | 35 | 43 |
| 40 | 35 | 43 |
| Mooney Scorch, Minutes at 250° F | 30+ | 13.0 |
| Mooney Viscosity, at 250° F | 28.0 | 43.0 |
| Cure Rate | | 30 |

¹ Soft cure.
² No break.

EXAMPLE VI

The following formulations (12)–(14) demonstrate that bisoxazolines do not act solely as an accelerator. In formulation (14) a combination of 0.6 part benzothiazyldisulfide and 0.5 part 2,2'-tetramethylenebis (4,4-dimethyl-2-oxazoline) resulted in a vulcanizate with higher modulus and tensile than formulation (13) and higher modulus than formulation (12). Thus the effects imparted by the combination are not obtained with an equal concentration of the accelerator benzothiazyl disulfide.

| Formulation | (12) | (13) | (14) |
|---|---|---|---|
| Parts by weight: | | | |
| Nat. Rubber | 100.0 | 100.0 | 100.0 |
| Stearic Acid | 3.0 | 3.0 | 3.0 |
| Zinc Oxide | 5.0 | 5.0 | 5.0 |
| Benzothiazyldisulfide | 0.6 | 1.1 | 0.6 |
| 2,2' tetramethylenebis (4,4-dimethyl-2-oxazoline) | | | 0.5 |
| Sulfur | 2.5 | 2.5 | 2.5 |
| Thermax | 75.0 | 75.0 | 75.0 |
| 300% Modulus, p.s.i.: | | | |
| Minutes at 293° F.: | | | |
| 15 | 950 | 1,180 | 1,590 |
| 30 | 1,190 | 1,350 | 1,590 |
| 400% Modulus, p.s.i.: | | | |
| Minutes at 293° F.: | | | |
| 15 | 1,510 | 1,810 | 2,100 |
| 30 | 1,820 | 1,950 | 2,120 |
| Tensile, p.s.i.: | | | |
| Minutes at 293° F.: | | | |
| 15 | 3,250 | 3,180 | 3,280 |
| 30 | 3,190 | 2,810 | 2,930 |
| Elongation, Percent: | | | |
| Minutes at 293° F.: | | | |
| 15 | 650 | 610 | 580 |
| 30 | 620 | 560 | 540 |
| Shore Hardness: | | | |
| Minutes at 293° F.: | | | |
| 15 | 50 | 53 | 58 |
| 30 | 55 | 57 | 59 |
| Mooney Scorch, at 250° F | 14.0 | 14.0 | 10.0 |
| Mooney Viscosity, at 250° F | 48.0 | 39.0 | 44 |
| Cure Rate | 6.0 | 6.0 | 12.0 |

EXAMPLE VII

The following formulations (15) and (16) demonstrate the increased modulus and tensile in stocks loaded with an inorganic pigment, i.e. clay.

| Formulation | (15) | (16) |
|---|---|---|
| Parts by weight: | | |
| Nat. Rubber | 60.0 | 650.0 |
| Stearic acid | 19.5 | 19.5 |
| Zinc Oxide | 32.5 | 32.5 |
| Benzothiazyldisulfide | 3.9 | 3.9 |
| 2,2'-tetramethylenebis (4,4-dimethyl-2-oxazoline) | | 13.0 |
| Sulfur | 16.3 | 16.3 |
| Dixie Clay | 487.5 | 487.5 |
| 300% Modulus, p.s.i.: | | |
| Minutes at 293° F.: | | |
| 10 | 830 | 1,790 |
| 15 | 1,030 | 17,00 |
| 20 | 950 | 1,330 |
| 30 | 1,060 | 1,370 |
| 40 | 1,010 | 1,300 |
| 400% Modulus, p.s.i.: | | |
| Minutes at 293° F.: | | |
| 10 | 1,280 | 2,660 |
| 15 | 1,600 | 2,410 |
| 20 | 1,520 | 2,000 |
| 30 | 1,680 | 2,060 |
| 40 | 1,590 | 1,990 |
| Tensile, p.s.i.: | | |
| Minutes at 293° F.: | | |
| 10 | 2,270 | 4,080 |
| 15 | 2,430 | 3,810 |
| 20 | 2,750 | 3,400 |
| 30 | 2,920 | 3,260 |
| 40 | 2,880 | 3,010 |
| Elongation, Percent: | | |
| Minutes at 293° F.: | | |
| 10 | 520 | 550 |
| 15 | 510 | 540 |
| 20 | 540 | 540 |
| 30 | 540 | 520 |
| 40 | 550 | 510 |
| Shore Hardness: | | |
| Minutes at 293° F.: | | |
| 10 | 50 | 65 |
| 15 | 51 | 65 |
| 20 | 52 | 65 |
| 30 | 55 | 65 |
| 40 | 55 | 65 |
| Angle Tear, 30 Minutes at 293° F | 356 | 415 |
| Mooney, Scorch, Minutes at 250° F | 23.5 | 12.0 |
| Cure Rate, Plasticity | 64 / 46.0 | 12.0 / 40.0 |

As shown, there was a very definite improvement in the modulus and tensile properties of the formulation containing the bisoxazoline. The elongation properties of the compound were satisfactory and the hardness was increased.

EXAMPLE VIII

The following formulations (17)–(24) demonstrate the effectiveness of a bisoxazoline with different carbon blacks. Black A is Thermax, a medium thermal black; Black B is P-33, a fine thermal black; Black C is IRB #1 HAF, a furnace black and Black D is NBS (Channel EPC), a channel black.

| Formulation | (17) | (18) | (19) | (20) | (21) | (22) | (23) | (24) |
|---|---|---|---|---|---|---|---|---|
| Nat. Rubber | 100.0 | 100.0 | 100.0 | 100.0 | 100.0 | 100.0 | 100.0 | 100.0 |
| Stearic Acid | 3.0 | 3.0 | 3.0 | 3.0 | 3.0 | 3.0 | 3.0 | 3.0 |
| Zinc Oxide | 5.0 | 5.0 | 5.0 | 5.0 | 5.0 | 5.0 | 5.0 | 5.0 |
| Benzothiazyldisulfide | 0.6 | 0.6 | 0.6 | 0.6 | 0.6 | 0.6 | 0.6 | 0.6 |
| 2,2'-tetramethylenebis(4,4'-dimethyl-2-oxazoline) | | 5.0 | | 5.0 | | 5.0 | | 5.0 |
| Sulfur | 2.5 | 2.5 | 2.5 | 2.5 | 2.5 | 2.5 | 2.5 | 2.5 |
| Black A | 50.0 | 50.0 | | | | | | |
| Black B | | | 50.0 | 50.0 | | | | |
| Black C | | | | | 50.0 | 50.0 | | |
| Black D | | | | | | | 50.0 | 50.0 |
| 300% Modulus, p.s.i.: | | | | | | | | |
| Minutes at 293° F.: | | | | | | | | |
| 10 | 390 | 730 | 340 | 590 | 1,410 | 2,100 | 730 | 1,260 |
| 15 | 470 | 820 | 460 | 630 | 1,600 | 2,330 | 1,060 | 1,460 |
| 20 | 590 | 810 | 580 | 620 | 1,880 | 2,420 | 1,200 | 1,520 |
| 30 | 650 | 800 | 610 | 680 | 1,890 | 2,480 | 1,380 | 1,660 |
| 40 | 790 | 830 | 600 | 660 | 2,210 | 2,610 | 1,600 | 1,710 |
| 400% Modulus, p.s.i.: | | | | | | | | |
| Minutes at 293° F.: | | | | | | | | |
| 10 | 680 | 1,240 | 680 | 990 | 2,080 | 2,990 | 1,190 | 2,000 |
| 15 | 790 | 1,400 | 720 | 1,010 | 2,520 | 3,170 | 1,590 | 2,250 |
| 20 | 990 | 1,390 | 920 | 1,010 | 2,610 | 3,300 | 1,790 | 2,320 |
| 30 | 1,100 | 1,390 | 1,010 | 1,090 | 2,770 | 3,350 | 2,010 | 2,550 |
| 40 | 1,310 | 1,410 | 1,190 | 1,100 | 3,080 | 3,520 | 2,390 | 2,590 |
| 500% Modulus, p.s.i.: | | | | | | | | |
| Minutes at 293° F.: | | | | | | | | |
| 10 | 1,100 | 2,100 | 1,110 | 1,790 | 2,770 | 3,770 | 1,750 | 2,890 |
| 15 | 1,230 | 2,390 | 1,350 | 1,910 | 3,030 | 3,860 | 2,220 | 3,190 |
| 20 | 1,610 | 2,320 | 1,570 | 1,960 | 3,260 | | 2,310 | 3,300 |
| 30 | 1,690 | 2,010 | 1,610 | 1,920 | 3,520 | | 2,920 | 3,450 |
| 40 | 1,990 | 1,910 | 1,610 | 1,900 | | | 3,200 | 3,550 |
| Tensile, p.s.i.: | | | | | | | | |
| Minutes at 293° F.: | | | | | | | | |
| 10 | 2,080 | 3,530 | 2,880 | 3,350 | 2,770 | 3,970 | 2,690 | 4,140 |
| 15 | 2,520 | 3,550 | 3,410 | 3,330 | 3,150 | 3,860 | 3,010 | 4,010 |
| 20 | 3,190 | 3,260 | 3,590 | 3,100 | 3,480 | 3,950 | 3,210 | 3,880 |
| 30 | 3,130 | 2,820 | 3,380 | 3,030 | 3,620 | 3,610 | 3,550 | 3,810 |
| 40 | 3,180 | 2,930 | 3,290 | 3,000 | 3,610 | 3,790 | 3,630 | 3,810 |
| Elongation, percent: | | | | | | | | |
| Minutes at 293° F.: | | | | | | | | |
| 10 | 670 | 640 | 740 | 630 | 500 | 540 | 640 | 660 |
| 15 | 680 | 620 | 750 | 620 | 510 | 500 | 610 | 600 |
| 20 | 680 | 600 | 730 | 600 | 520 | 490 | 590 | 570 |
| 30 | 680 | 550 | 700 | 600 | 510 | 430 | 580 | 540 |
| 40 | 650 | 550 | 690 | 590 | 480 | 430 | 560 | 530 |
| Shore Hardness: | | | | | | | | |
| Minutes at 293° F.: | | | | | | | | |
| 10 | 38 | 55 | 41 | 44 | 57 | 70 | 50 | 67 |
| 15 | 41 | 55 | 45 | 55 | 60 | 70 | 58 | 70 |
| 20 | 45 | 55 | 46 | 55 | 63 | 71 | 59 | 70 |
| 30 | 46 | 54 | 49 | 56 | 67 | 72 | 64 | 71 |
| 40 | 49 | 54 | 51 | 55 | 67 | 72 | 64 | 72 |
| Angle Tear, 30 minutes at 293° F | 250 | 259 | 334 | 272 | 392 | 467 | 408 | 494 |
| Mooney Scorch, Minutes at 250° F | 30.0+ | 6.5 | 21.5 | 6.0 | 14.0 | 5.0 | 25.0 | 8.0 |
| Cure Rate | | 20.0 | 6.4 | 30.0 | 12.0 | 30.0 | 5.0 | 20.0 |
| Plasticity | | 33.0 | 31.0 | 34.0 | 35.0 | 58.0 | 61.0 | 52.0 | 50.0 |

A comparison of the 2,2'-tetramethylenebis (4,4'-dimethyl-2-oxazoline) containing medium thermal formulation (18) with the control formulation (17) shows a general increase in modulus and higher tensile strengths at 10', 15' and 20' cure times.

Formulations (19) and (20) represent a control and a bisoxazoline containing formulation loaded with P-33, a fine thermal black. Increased modulus was observed at almost all cure times while increased tensile was imparted at the 10' cure time.

Formulations (21) and (22) were loaded with a high abrasion furnace black. A general increase in both tensile and modulus were observed for the bisoxazoline containing formulation (22) versus the control formulation (21).

Formulations (23) and (24) were loaded with an easy processing channel black. The addition of bisoxazoline resulted in significantly higher tensile and modulus in the vulcanized compound.

Examples IX, X, and XI demonstrate the effects of a bisoxazoline in a nitrile rubber (Paracril BLT), a butyl rubber and an SBR rubber.

EXAMPLE IX

| Formulation | (25) | (26) |
|---|---|---|
| Parts by weight: | | |
| Acrylonitrile rubber | 100.0 | 100.0 |
| Zinc oxide | 5.0 | 5.0 |
| Sulfur | 1.5 | 1.5 |
| Stearic acid | 1.0 | 1.0 |
| Benzothiazyldisulfide | 1.0 | 1.0 |
| 2,2'-tetramethylenebis (4,4-dimethyl-2-oxazoline) | | 10.0 |
| Medium Thermal Black | 50.0 | 50.0 |
| 300% Modulus, p.s.i.: Minutes at 302° F.: | | |
| 20 | (¹) | 460 |
| 40 | 500 | 610 |
| 80 | 600 | 610 |
| 500% Modulus, p.s.i.: Minutes at 302° F.: | | |
| 20 | (¹) | 980 |
| 40 | 1,010 | 1,200 |
| 80 | 1,190 | 1,350 |
| Tensile, p.s.i.: Minutes at 302° F.: | | |
| 20 | (¹) | 2,260 |
| 40 | 1,670 | 1,810 |
| 80 | 1,480 | 1,980 |
| Elongation, percent: Minutes at 302° F.: | | |
| 20 | (¹) | 860 |
| 40 | 900 | 720 |
| 80 | 700 | 690 |
| Shore Hardness: Minutes at 302° F.: | | |
| 20 | 55 | 56 |
| 40 | 59 | 58 |
| 80 | 61 | 60 |

¹ Semicure.

A comparison of formulations (25) and (26) in Example IX shows the bisoxazoline to accelerate and result in higher modulus and tensile in a nitrile rubber compound.

EXAMPLE X

Batch (parts by weight):
  Butyl _____ 100.0
  Stearic acid _____ 3.0
  Zinc oxide _____ 5.0
  Sulfur _____ 2.0
  Benzothiazyldisulfide _____ 0.5
  Tetramethylthiuram disulfide _____ 1.0
  2,2'-tetramethylenebis (4,4-dimethyl-2-oxazoline) _____ 2.0
  Medium thermal black _____ 50.0

| | Formulation | |
|---|---|---|
| | (27) | (28) |
| | Control—no bisoxazoline added | 2.0 parts bisoxazoline added |
| 300% Modulus, p.s.i.: Minutes at 302° F.: | | |
| 25 | 400 | 280 |
| 50 | 410 | 290 |
| 100 | 460 | 300 |
| 500% Modulus, p.s.i.: Minutes at 302° F.: | | |
| 25 | 610 | 420 |
| 50 | | 490 |
| 100 | | 470 |
| Tensile, p.s.i.: Minutes at 302° F.: | | |
| 25 | 1,520 | 1,990 |
| 50 | 600 | 610 |
| 100 | 460 | 590 |
| Elongation, percent: Minutes at 302° F.: | | |
| 25 | 720 | 780 |
| 50 | 420 | 540 |
| 100 | 300 | 550 |
| Shore Hardness: Minutes at 302° F.: | | |
| 25 | 47 | 46 |
| 50 | 52 | 51 |
| 100 | 52 | 52 |
| Mooney Scorch, Minutes at 250° F | 30+ | |
| Angle Tear, 50 Minutes at 302° F | 125 | 135 |

Example X shows the bisoxazoline formulation (28) to give a vulcanizate with higher tensile strength and increased tear resistance in a butyl compound.

EXAMPLE XI

Batch (parts by weight):
  SBR _____ 100.0
  Stearic acid _____ 1.5
  Medium thermal black _____ 40.0
  Zinc oxide _____ 5.0
  Sulfur _____ 2.0
  Benzothiazyldisulfide _____ 3.0
  2,2'-tetramethylenebis (4,4-dimethyl-2-oxazoline) _____ 2.0

| | Formulation | |
|---|---|---|
| | (29) | (30) |
| | Control—no bisoxazoline added | 2.0 parts bisoxazoline added |
| 200% Modulus, p.s.i.: Minutes at 302° F.: | | |
| 15 | (¹) | 420 |
| 30 | (¹) | 440 |
| 60 | (¹) | 430 |
| 300% Modulus, p.s.i.: Minutes at 302° F.: | | |
| 15 | (²) | 780 |
| 30 | 210 | 850 |
| 60 | 320 | 810 |
| 400% Modulus, p.s.i.: Minutes at 302° F.: | | |
| 15 | (²) | |
| 30 | 410 | |
| 60 | 440 | |
| Tensile: Minutes at 302° F.: | | |
| 15 | (²) | 1,010 |
| 30 | 1,030 | 850 |
| 60 | 1,120 | 1,000 |
| Elongation, percent: Minutes at 302° F.: | | |
| 15 | (²) | 360 |
| 30 | 650 | 300 |
| 60 | 780 | 330 |
| Shore Hardness: Minutes at 302° F.: | | |
| 15 | (²) | 56 |
| 30 | 47 | 57 |
| 60 | 47 | 55 |
| Mooney Scorch, Minutes at 250° F | 30+ | 14.0 |
| Cure Rate | | 10.0 |
| Plasticity | | 31.0 |

¹ Not recorded.
² Soft cure.

In Example XI the addition of bisoxazoline to an SBR stock resulted in a faster cure rate and vulcanizates with higher modulus.

EXAMPLES XII–XXV

Rubber can be compounded using the formulation of Example XIX replacing the bisoxazoline compound and the rubber-like material with the material designated below.

| Example | Compound | Rubber-like Material Used |
|---|---|---|
| XII | 2,2'-dimethylenebis-(4,4-dimethyl-2-oxazoline). | Natural rubber. |
| XIII | 2,2'-trimethylenebis-(4,4-dimethyl-2-oxazoline). | Acrylonitrile-butadiene. |
| XIV | 2,2'-tetramethylenebis-(4,4-dimethyl-2-oxazoline). | Neoprene. |
| XV | 2,2'-pentamethylenebis-(4,4-dimethyl-2-oxazoline). | Natural rubber. |
| XVI | 2,2'-hexamethylenebis-(4,4-dimethyl-2-oxazoline). | Do. |
| XVII | 2,2'-heptamethylenebis-(4,4-dimethyl-2-oxazoline). | Do. |
| XVIII | 2,2-hexamethylenebis-(4,4-dimethyl-2-oxazoline). | Acrylonitrile-butadiene. |
| XIX | 2,2-trimethylenebis-(4,4-dimethyl-2-oxazoline). | Butadienestyrene. |
| XX | 2,2'-tetramethylenebis-(4,4'-dimethyl-2-oxazoline). | Ethylene-propylene terpolymer. |
| XXI | 2,2'-tetramethylenebis-(4,4-dihydroxymethyl-2-oxazoline). | Natural rubber. |
| XXII | 2,2'-pentamethylenebis-(4-hydroxymethyl-4-methyl-2-oxazoline). | Do. |
| XXIII | 2,2'-tetramethylenebis-(4,4-diethyl-2-oxazoline. | Do. |
| XXIV | 2,2'-tetramethylenebis-(4,-butyl-4-methyl-2-oxazoline). | Do. |
| XXV | 2,2'-hexamethylenebis-(2-oxazoline) | Do. |

EXAMPLE XXVI

Three batches (a)–(c) of synthetic rubber having the following composition in parts by weight were formulated with 2,2'-tetramethylenebis-(4,4-dimethyl-2-oxazoline), and evaluated as follows:

FORMULATIONS

| Batch No | (a) | (b) | (c) |
|---|---|---|---|
| SBG-1500 [1] | 100.0 | 100.0 | 100.0 |
| ZnO | 5.0 | 5.0 | 5.0 |
| Stearic Acid | 1.5 | 1.5 | 1.5 |
| Sulfur | 2.0 | 2.0 | 2.0 |
| Benzothiazyldisulfide | 2.0 | 2.0 | 2.0 |
| Bisoxazoline | 0.5 | | 1.0 |
| Diphenyl guanidine | | 0.5 | |
| High abrasion furnace black | 50.0 | 50.0 | 50.0 |
| 100% Modulus, p.s.i.: | | | |
| 25 min. at 293° F | 420 | 600 | 620 |
| 50 min | 600 | 620 | 700 |
| 200% Modulus, p.s.i.: | | | |
| 25 min. at 295° F | 1,380 | 1,770 | 1,830 |
| 50 min | 1,680 | 1,900 | 2,040 |
| 300% Modulus, p.s.i.: | | | |
| 25 min. at 293° F | 2,530 | 3,020 | 3,200 |
| 50 min | 3,180 | | 3,610 |
| 400% Modulus, p.s.i.: | | | |
| 25 min. at 293° F | 3,580 | | |
| 50 min | | | |
| Tensile, p.s.i.: | | | |
| 25 min. at 293° F | 3,910 | 3,020 | 3,810 |
| 50 min | 3,750 | 2,880 | 3,960 |
| Elongation, percent: | | | |
| 25 min. at 293° F | 450 | 300 | 350 |
| 50 min | 360 | 270 | 300 |
| Shore Hardness: | | | |
| 25 min. at 293° F | 72 | 72 | 74 |
| 50 min | 74 | 74 | 75 |
| Scorch, 293° F | 8.0 | 7.0 | 7.5 |
| Viscosity at 293° F | 54 | 52 | 52 |
| Cure Gate | 15 | 15 | 20 |

[1] SBR-1500 is a styrene butadiene copolymer containing about 23.5% styrene polymerized at about 5° C.

Batches (a) and (b), respectively, compare the bisoxazoline with a known accelerator, diphenylguanidine (DPG) in an SBR compound. When compared at the 0.5 part level, the bisoxazoline formulations provided a vulcanizate having slightly lower modulus than the known formulation. However, the elongation and tensile properties of the bisoxazoline formulation showed a marked improvement over the DPG accelerated formulation. Batch (c) containing 1.0 parts of the bisoxazoline showed higher modulus, tensile, and elongation than did the DPG accelerated compound.

It is claimed:

1. A method for vulcanizing rubber, comprising vulcanizing a vulcanizable rubber containing a vulcanizing agent and physical property-enhancing amounts of a compound of the formula:

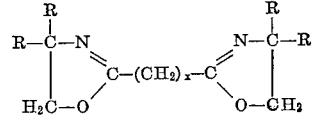

wherein R is selected from the group consisting of hydrogen, lower alkyl and lower hydroxyalkyl and x is an integer from 2 to 8 to produce an improved vulcanizate.

2. The method of claim 1 wherein said amount is from 0.01 to 15 parts by weight of said compound per 100 parts by weight of said rubber.

3. A vulcanizable composition comprising a vulcanizable rubber having incorporated therein from about 0.01 to about 15 parts by weight per 100 parts by weight of the rubber of a compound having the formula:

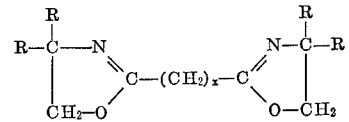

wherein R is selected from the group consisting of hydrogen, lower alkyl and lower hydroxyalkyl and x is an integer from 2 to 8.

4. The composition of claim 3 wherein said compound is 2,2'-dimethylenebis-(4,4-dimethyl-2-oxazoline).

5. The composition of claim 3 wherein said compound is 2,2'-trimethylenebis-(4,4-dimethyl-2-oxazoline).

6. The composition of claim 3 wherein said compound is 2,2'-tetramethylenebis-(4,4-dimethyl-2-oxazoline).

7. The composition of claim 3 wherein said compound is 2,2'-pentamethylenebis-(4,4-dimethyl-2-oxazoline).

8. The composition of claim 3 wherein said compound is 2,2'-hexamethylenebis-(4,4-dimethyl-2-oxazoline).

9. The composition of claim 3 wherein said compound is 2,2'-heptamethylenebis-(4,4-dimethyl-2-oxazoline).

10. The composition of claim 3 wherein said compound is 2,2'-octamethylenebis-(4,4-dimethyl-2-oxazoline).

11. The composition of claim 3 wherein said compound is 2,2'-tetramethylenebis-(4,4-bishydroxymethyl-2-oxazoline).

12. The composition of claim 3 wherein said compound is 2,2' - tetramethylenebis-(4-hydroxymethyl-4-methyl-2-oxazoline).

13. The composition of claim 3 having incorporated therein clay in an amount to reinforce the composition.

14. The composition of claim 3 having incorporated therein a carbon black.

15. The composition of claim 3 wherein said rubber is natural rubber.

16. The composition of claim 3 wherein said rubber is butyl rubber.

17. The composition of claim 3 wherein said rubber is a nitrile rubber.

18. The composition of claim 3 wherein said rubber is an SBR rubber.

19. A rubber vulvanizate obtained by vulcanizing a vulcanizable rubber containing a vulcanizing agent and a bis-oxazoline of the formula:

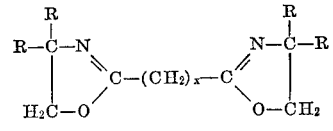

wherein R is selected from the group consisting of lower alkyl and lower hydroxyalkyl and $x$ is an integer from 2 to 8 in an amount from 0.01 to 15 parts by weight per 100 parts by weight of said rubber, said rubber being selected from the group consisting of natural rubber, synthetic rubber polymers prepared by polymerizing a conjugated diene containing from 4 to 10 carbon atoms, and synthetic rubber polymers prepared by polymerizing a conjugated diene containing from 4 to 10 carbon atoms with an unsaturated comonomer selected from the group consisting of styrene, acrylonitrile, methacrylonitrile, methyl vinyl ether, methyl methacrylate, and vinyl substituted pyridine.

20. The composition of claim 19 wherein said amount is from about 0.1 to 10 parts by weight per 100 parts by weight of said rubber.

21. The product produced by the method of claim 1.

22. The composition of claim 3 having incorporated therein from about 1 to 400 parts by weight of clay per 100 parts by weight of rubber.

23. A method for vulcanizing rubber comprising vulcanizing a vulcanizable rubber containing a sulfur vulcanizing agent and physical property-enhancing amounts of a compound of the formula:

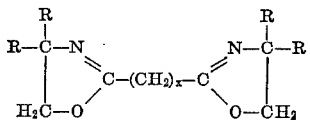

wherein R is selected from the group consisting of hydrogen, lower alkyl and lower hydroxyalkyl and $x$ is an integer from 2 to 8 to produce an improved vulcanizate.

24. A rubber vulcanizate composition produced by vulcanization of a vulcanizable rubber with a sulphur vulcanizing agent, the rubber having incorporated therein from about 0.01 to about 15 parts by weight per 100 parts by weight of the rubber of a compound having the formula:

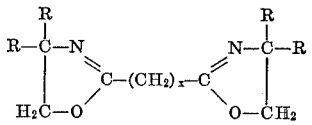

wherein R is selected from the group consisting of hydrogen, lower alkyl and lower hydroxyalkyl and $x$ is an integer from 2 to 8.

References Cited
UNITED STATES PATENTS

| | | | |
|---|---|---|---|
| 2,343,566 | 3/1944 | Mathis | 260—784 |
| 2,569,428 | 9/1951 | Rowland | 260—307.6 |
| 2,844,589 | 7/1958 | Hess | 260—784 |

MORRIS LIEBMAN, *Primary Examiner.*

J. E. CALLAGHAN, *Assistant Examiner.*

U.S. Cl. X.R.

260—41, 784